United States Patent
Barbir et al.

(10) Patent No.: US 9,094,391 B2
(45) Date of Patent: Jul. 28, 2015

(54) DYNAMIC TRUST FEDERATION

(71) Applicant: Bank of America Corporation, Charlotte, NC (US)

(72) Inventors: Abbie Barbir, Ontario (CA); Radu Marian, Indian Trail, NC (US); Cynthia A. Frick, Newark, DE (US); John H. Kling, Bellevue, KY (US); Michael Simon, Cedar Hill, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/051,073

(22) Filed: Oct. 10, 2013

(65) Prior Publication Data
US 2015/0106895 A1    Apr. 16, 2015

(51) Int. Cl.
*H04L 29/06*    (2006.01)
(52) U.S. Cl.
CPC ..................... *H04L 63/08* (2013.01)
(58) Field of Classification Search
CPC ..................................... H04L 63/08
USPC .......................................... 726/18
See application file for complete search history.

(56) References Cited

U.S. PATENT DOCUMENTS

| | | | |
|---|---|---|---|
| 5,784,463 A * | 7/1998 | Chen et al. ............ | 713/171 |
| 6,560,719 B1 * | 5/2003 | Pham et al. ............ | 714/15 |
| 6,944,761 B2 | 9/2005 | Wood et al. | |
| 7,310,734 B2 | 12/2007 | Boate et al. | |
| 2002/0076204 A1 * | 6/2002 | Nakano et al. .......... | 386/94 |
| 2006/0242065 A1 * | 10/2006 | Jogand-Coulomb et al. | 705/50 |
| 2007/0101400 A1 * | 5/2007 | Freeman et al. ........ | 726/2 |
| 2008/0028453 A1 | 1/2008 | Nguyen et al. | |
| 2013/0159476 A1 * | 6/2013 | Hilburn et al. ........ | 709/220 |
| 2013/0160099 A1 * | 6/2013 | Fitzpatrick, III ....... | 726/7 |
| 2013/0205380 A1 | 8/2013 | Avni et al. | |
| 2014/0282877 A1 * | 9/2014 | Mahaffey et al. ........ | 726/3 |

OTHER PUBLICATIONS

M. WaldVogel, G. Caronni, N. Weiler, B. Plattner, "The VersaKey Framework: Versatile Group key Management", IEEE, vol. 17, No. 9, pp. 1614-1631, Apr. 1, 1999.*
International Search Report and Written Opinion of the International Searching Authority corresponding to International Application No. PCT/US2014/059047 dated Jan. 14, 2015.

* cited by examiner

*Primary Examiner* — Mohammad L Rahman
(74) *Attorney, Agent, or Firm* — Banner & Witcoff, Ltd.; Michael A. Springs

(57) ABSTRACT

Aspects of the present disclosure are directed to methods and systems dynamic trust federation. In one aspect, a computer implemented method may include a security token that enables sign-on into a group applications based on applicable trust criteria. In one aspect, when a user interacts with one application in the group, the trust is elevated through the application internal authentication application program interface (API). The trust may be included in the security token to make available to other applications in the group. Applications can be in multiple groups with variable level of authentication based on location and other transactions variables.

19 Claims, 4 Drawing Sheets

US 9,094,391 B2

DYNAMIC TRUST FEDERATION

BACKGROUND

Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Numerous consumers use the Internet, among things to purchase products on-line, locate special events, read news stories, pay bills or perform on-line banking. Numerous business establishments are connected to the Internet to provide products and services to the consumer or perform business-to-business electronic commerce. E-commerce and Internet applications operate and transmit data over a world-wide interconnected communications network.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to methods and systems dynamic trust federation. In one aspect, a computer implemented method may include a security token that enables sign-on into a group applications based on applicable trust criteria. In one aspect, when a user interacts with one application in the group, the trust is elevated through the application internal authentication application program interface (API). The trust is then included in the security token to make available to other applications in the group. Applications can be in multiple groups with variable level of authentication based on location and other transactions variables.

In one aspect of the present disclosure, a computer implemented method in a network in include steps of electronically maintaining a plurality of different applications associated with a plurality of user accounts in a network; the plurality of different applications forming a group having a security token associated therewith. In one aspect, a method includes electronically receiving a request for sign-on to at least one of the different applications associated with at least one user account. In another aspect, a method includes responsive to the request for the sign-on, electronically determining a level of authentication associated with the least one user account. In yet another aspect, a method includes electronically validating a level of authentication with the security token associated with the plurality of different applications. In an aspect, a method includes electronically receiving a request to change the level of authentication; and electronically modifying the level of authentication associated with the security token for the plurality of different applications.

In other aspects of the present disclosure, a method includes electronically maintaining a subgroup of the plurality of different applications associated with a plurality of user accounts in a network; the subset of a plurality of different applications having a subgroup security token. In another aspect, a method includes electronically receiving a request for sign-on to at least one of the different applications in the subgroup. In yet another aspect, a method includes responsive to the request for the sign-on, electronically determining a level of authentication associated with the least one user account.

In another aspect, a method includes electronically validating a level of authentication with the subgroup security token associated with the subgroup of the plurality of different applications. In yet another aspect, a method includes electronically receiving a request to change the level of authentication for the subgroup of the plurality of different applications; and electronically modifying the level of authentication associated with the subgroup security token.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
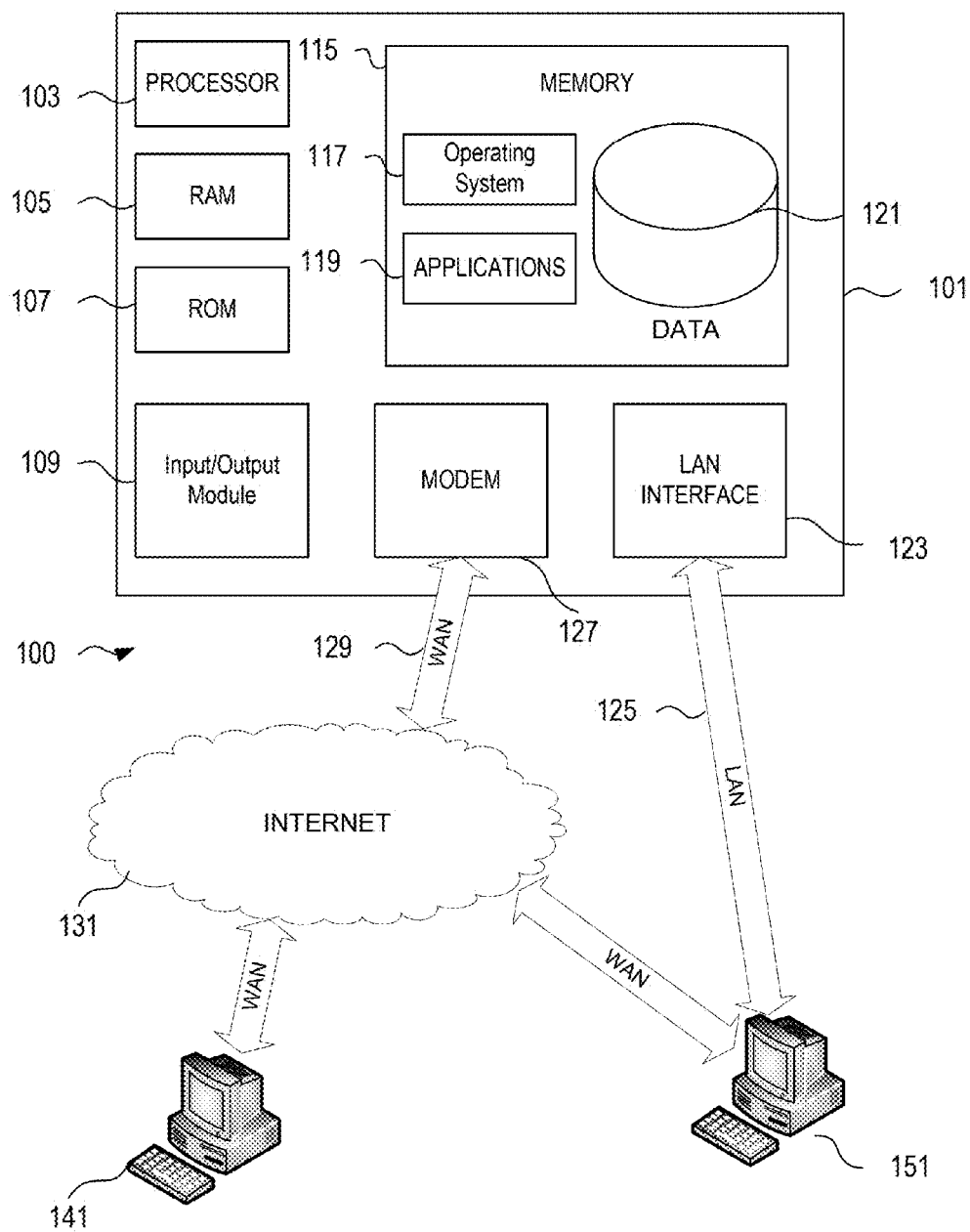
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101.

Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
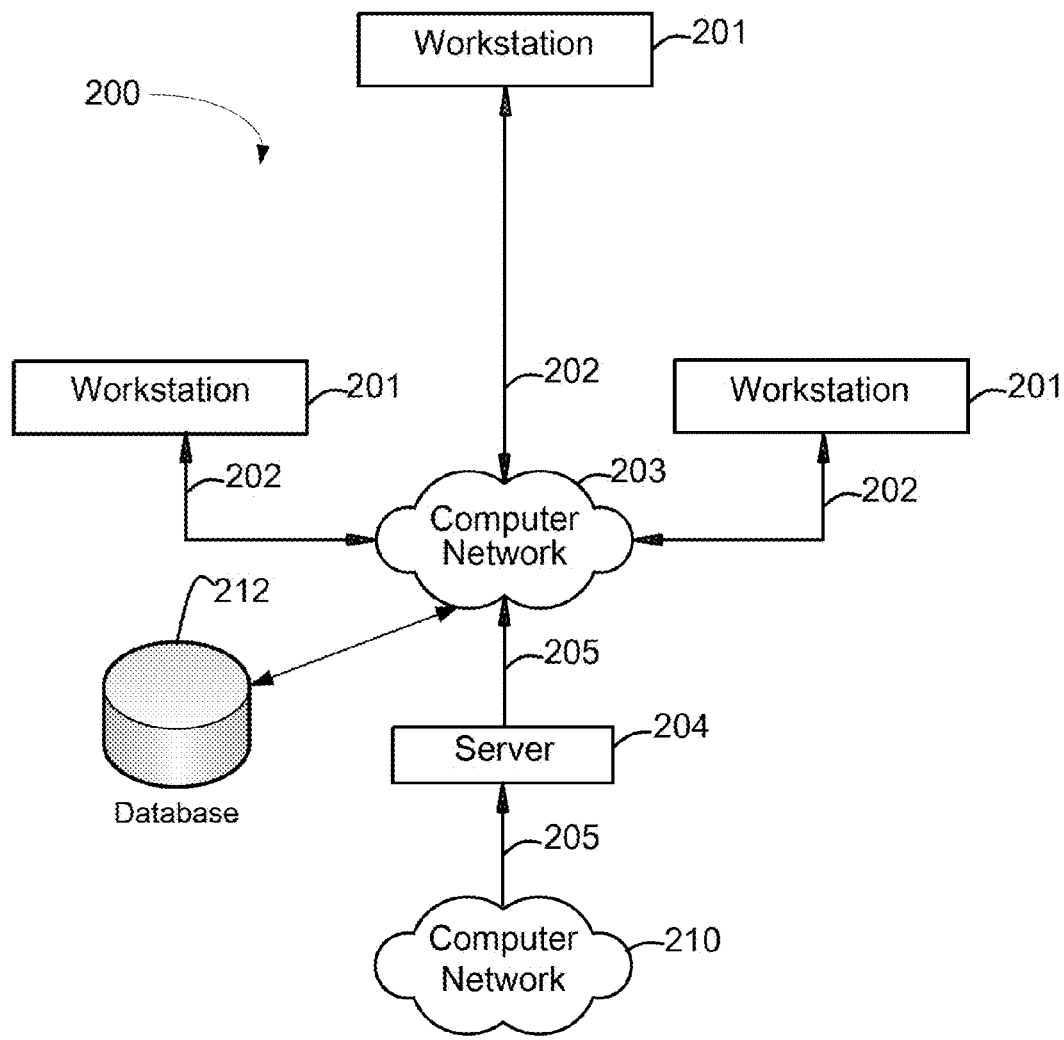
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
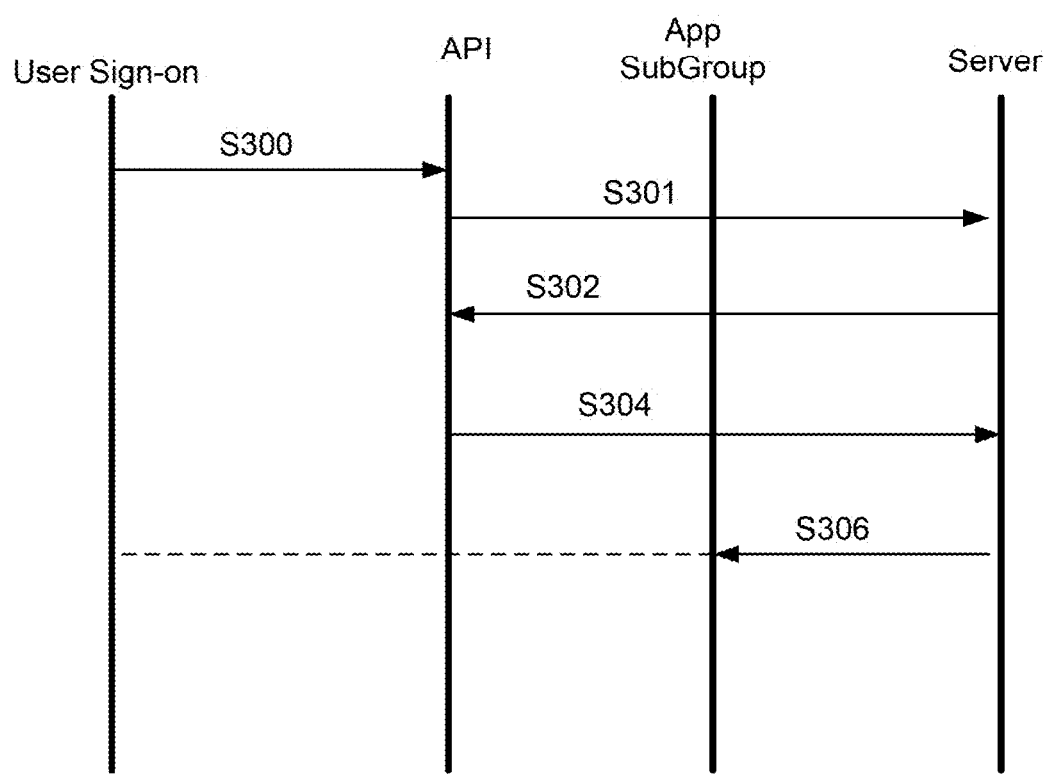
FIG. 3 depicts an illustrative process in which various aspects of the present disclosure may be implemented in accordance with one or more example embodiments.

Referring to FIG. 3, in an example, in step S300, the user attempts to sign-on the application. In step S301, the application API transmits an authentication request to the Network Cloud Server 204. In this configuration of the device/workstation includes a network address to access the server 204. The network server 204 is electronically connected to a database 212 (see FIG. 2) having predetermined trust levels (e.g., level of authentication) for a specific application or group federation of applications in the network eco-system. Different levels of trust authentication can be provided within aspects of the method. In one example, the levels of authentication can proceed from LOA-1 to LOA-4. At each LOA or authentication level—the authentication strength is the function of the credential strength and the way the use the credentials to perform the desired authentication. For instance, Level 2 would be for example, the user would go to a website and enter their user name/password and phone number and they can validate the phone number. Level 3 may include one or more credentials pertaining to an enterprise network authentication. For instances. The user is logged on and they have some password or the security system sent the user a text message to their cell phone or the credentials may come from network. There may be a higher level to have a pre-validated license by a trust authority. In another example, with respect to Level 4 before the user is issued the credentials, the user may have to be validated in-person with a unique identification code and desired security verification checks on the user. Each level may be sub-levels with multiple levels to provide a range of information and flexibility for authentication.

In step S302, the network server 204 send transmit back a "security token" with the level of trust authentication to the API of the application. In one aspect, the "security token" is provided for authentication to a grouped application based on applicable trust criteria. In one aspect, when a user interacts with one application in the group, the trust is elevated through the application internal authentication application program interface (API). The trust is then included in the security token to make available to other applications in the group. Applications can be in multiple groups with variable level of authentication based on network location or source IP address, geographic location and other transactions variables.

The API receives the token and accepts or denies access to the user login based on the predetermined level of trust. In this way, the authentication is not application centric anymore but it is more pertaining to participating applications. The authentication layer part of the process becomes dynamic and user specified and more generic to enable applications to be part of the federation. It should be note that the process using a desired API can implemented using a mobile computing device as the "security token" from server can be transmitted across the network to the device.

In another aspect of the process, in step S304, the API may be configured to enhance the authentication information dynamically with a different level of authentication. For example, the API can save the different level of authentication in a security token. Subsequently, the process can store the dynamically modified token to the network server for the program or the user device (temporarily) or in some other network location that could be pointed to and the API know how to find it. In various aspect, the modified token or multiple-modified tokens can store the information about how long it would be used, by user identification, geo-location (global positioning system (GPS) data), the time of period of the day (e.g., increments of only six hours such morning, afternoon, evening) and other similar data.

In another aspect, in Step S306, the level of authentication can have the federation groups drop in or drop out of that trust levels based on a predetermined policy and may be changed dynamically for the group(s) selectively by the user (denoted by dotted lines). For example, the predetermined policy may be includes multiple variations for trust levels. In one example, if the user is locally connected to a node on the internal enterprise network, there may be a two levels authentication (e.g. user name and password). If the user is connected at node on indicated to be at geo-location from the network, the predetermined policy pertains to a need for a higher level of trust authentication, including three-factor or four-factor credentials.

Figure 4:
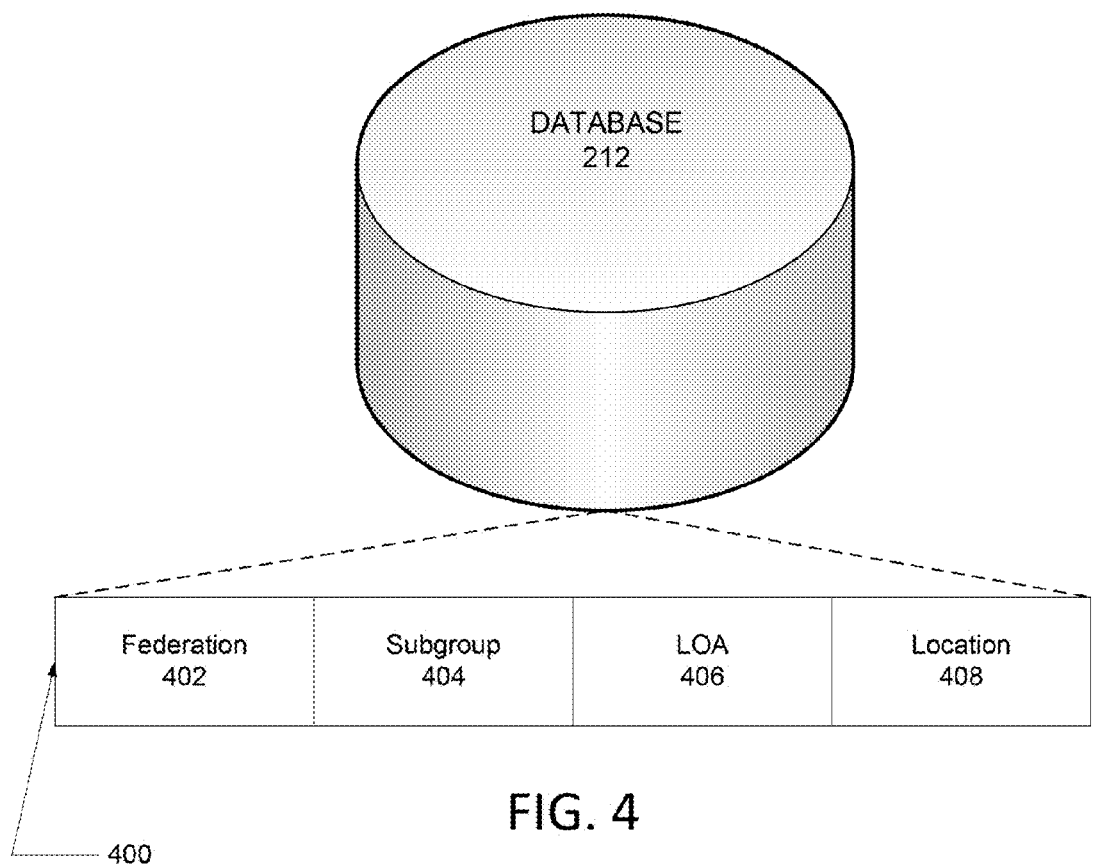
FIG. 4 depicts an illustrative operating environment in which various aspects of the present disclosure may be implemented in accordance with one or more example embodiments.

With continued reference to FIG. 4, the security token 400 can be provide in many different digital configurations, according to an embodiment, database 212. The security token may include federation data 402, subgroup data 404, a level of trust data 406, geo-location attribute 408 and other credentials data.

One or more aspects of the disclosure may be implemented with security network data. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof.

Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer implemented method in an electronic computer network, comprising:
    electronically maintaining a plurality of different applications associated with a plurality of different user accounts in a database of computer readable memory connected to an electronic computer network; the plurality of different applications forming an electronic federated group having a computer readable security token of the federated group associated therewith; the security token having a first level of authentication stored therein for access to the federated group, the security token including a federation identification attribute for identification of the federation group, and a geo-location attribute;
    at a computer processor server, electronically receiving a request for sign-on to at least one of the different applications in the federated group associated with at least one user account, wherein the request for sign-on originates from a mobile computing device connected to the electronic computer network;
    responsive to the request for the sign-on at a computer processor server, electronically determining a level of authentication associated with the least one user account;
    electronically validating the level of authentication with the first level of authentication of the security token associated with the federated group;
    electronically transmitting the security token to a computer readable memory of the mobile computing device;
    electronically receiving a request to change the first level of authentication; and electronically modifying at the first level of authentication associated with the security token stored in the computer readable memory of the mobile computing device for the federated group to a second level of authentication and electronically storing the second level of authentication in the security token for the federated group thereby permitting a subsequent request for sign-on by another user account on another computing device to be validated with the second level of authentication, the first level of authentication being different from the second level of authentication.

2. The method according to claim 1, wherein the level of authentication is modified based on a network node location associated with the request to change the first level of authentication.

3. The method according to claim 1, wherein the level of authentication is modified based on a global positioning coordinates associated with the request to change the first level of authentication.

4. The method of according to claim 1, wherein the level of authentication is modified based on a range during a time of day of the request to change the first level of authentication.

5. The method according to claim 1, further comprising a step of electronically saving the security token with the second level of authentication for a predetermined period of time and then reverting back to the first level of authentication.

6. The method according to claim 1, further comprising electronically maintaining a first subgroup of the plurality of different applications in the federated group associated with the plurality of different user accounts in a network; the first subgroup of the plurality of different applications having a first subgroup security token wherein the first subgroup security token includes a third level of authentication stored therein for access to the federated subgroup, the security token including the federation identification attribute for identification of the federation group, subgroup identification attribute, and the geo-location attribute.

7. The method according to claim 6, further comprising electronically receiving a request for sign-on to at least one of the different applications in the first subgroup;
    responsive to the request for the sign-on, electronically determining a level of authentication associated with the least one user account;
    electronically validating a level of authentication with the first subgroup security token associated with the subgroup of the plurality of different applications;
    electronically receiving a request to change the level of authentication for the first subgroup of the plurality of different applications; and electronically modifying the level of authentication associated with the first subgroup security token.

8. The method according to claim 7, wherein the level of authentication for the first subgroup is modified based on a network node location associated with the request to change the level of authentication.

9. The method according to claim 7, wherein the level of authentication for the first subgroup is modified based on a global positioning coordinates associated with the request to change the level of authentication.

10. One or more non-transitory computer readable media storing computer executable instructions that, when executed by at least one processor, cause the at least one processor to perform a method comprising:
    electronically maintaining a plurality of different applications associated with a plurality of different user accounts in a database of computer readable memory connected to an electronic computer network; the plurality of different applications forming an electronic federated group having a computer readable security token of the federated group associated therewith; the security token having a first level of authentication stored therein for access to the federated group, the security token including a federation identification attribute for identification of the federation group, and a geo-location attribute;
    electronically receiving a request for sign-on to at least one of the different applications in the federated group associated with at least one user account, wherein the request for sign-on originates from a mobile computing device connected to the electronic computer network;

responsive to the request for the sign-on, electronically determining a level of authentication associated with the least one user account;

electronically validating the level of authentication with the first level of authentication of the security token associated with the federated group;

electronically transmitting the security token to a computer readable memory of the mobile computing device;

electronically receiving a request to change the first level of authentication; and electronically modifying at the first level of authentication associated with the security token stored in the computer readable memory of the mobile computing device for the federated group to a second level of authentication and electronically storing the second level of authentication in the security token for the federated group thereby permitting a subsequent request for sign-on by another user account on another computing device to be validated with the second level of authentication, the first level of authentication being different from the second level of authentication.

11. The one or more non-transitory computer readable media of claim 10, wherein the level of authentication is modified based on a network node location associated with the request to change the first level of authentication.

12. The one or more non-transitory computer readable media of claim 10, wherein the level of authentication is modified based on a global positioning associated with the request to change the first level of authentication.

13. The one or more non-transitory computer readable media of claim 10, wherein the level of authentication is modified based on a range of a time of day of the request to change the first level of authentication.

14. The one or more non-transitory computer readable media of claim 10, further comprising a step electronically saving the security token with the second level of authentication for a predetermined period of time and then reverting back to the first level of authentication.

15. The one or more non-transitory computer readable media of claim 10, further comprising a step of electronically maintaining a first subgroup of the plurality of different applications in the federated group associated with the plurality of user accounts in the electronic network; the first subgroup of the plurality of different applications having a first subgroup security token, wherein the first subgroup security token includes a third level of authentication stored therein for access to the federated subgroup, the security token including the federation identification attribute for identification of the federation group, subgroup identification attribute, and the geo-location attribute.

16. The one or more non-transitory computer readable media of claim 15, further comprising steps of electronically receiving a request for sign-on to at least one of the different applications in the first subgroup;

responsive to the request for the sign-on, electronically determining a level of authentication associated with the least one user account;

electronically validating a level of authentication with the subgroup security token associated with the first subgroup of the plurality of different applications;

electronically receiving a request to change the level of authentication for the first subgroup of the plurality of different applications; and electronically modifying the level of authentication associated with the first subgroup security token.

17. The one or more non-transitory computer readable media of claim 16, wherein the level of authentication is modified based on a network node location associated with the request to change the level of authentication.

18. The one or more non-transitory computer readable media of claim 16, wherein the level of authentication is modified based on a global positioning coordinates associated with the request to change the level of authentication.

19. The one or more non-transitory computer readable media of claim 16, further comprising a steps of electronically maintaining a second subgroup of the plurality of different applications associated with a plurality of user accounts in a network; the second subgroup of a plurality of different applications having a second subgroup security token; electronically receiving a request to change the level of authentication for the second subgroup of the plurality of different applications; and electronically modifying the level of authentication associated with the second subgroup security token.

* * * * *